Dec. 10, 1946.   B. E. HOUSE   2,412,335
BRAKE
Filed Aug. 9, 1944   3 Sheets-Sheet 1

INVENTOR
BRYAN E. HOUSE
BY
ATTORNEY

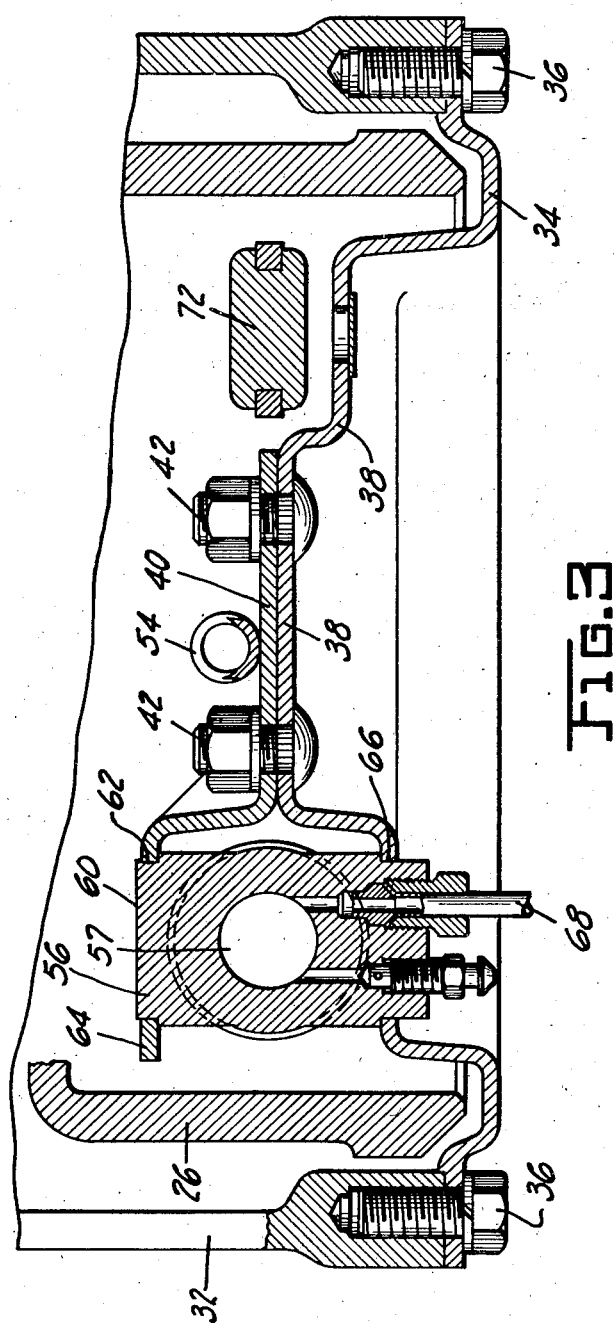

Patented Dec. 10, 1946

2,412,335

UNITED STATES PATENT OFFICE 2,412,335

BRAKE

Bryan E. House, South Bend, Ind., assignor to Bendix Aviation Corporation, South Bend, Ind., a corporation of Delaware Application August 9, 1944, Serial No. 548,640

7 Claims. (Cl. 188—78)

This invention relates to brakes, and particularly to the construction and arrangement of the torque reaction means of a drum type brake.

An object of the invention is to provide an improved brake arrangement for a vehicle in which the brake drum is mounted at or near the end of the axle.

In the drawings,

Figure 3 is a section taken on the line 3—3 of Figure 1.

Figure 1:
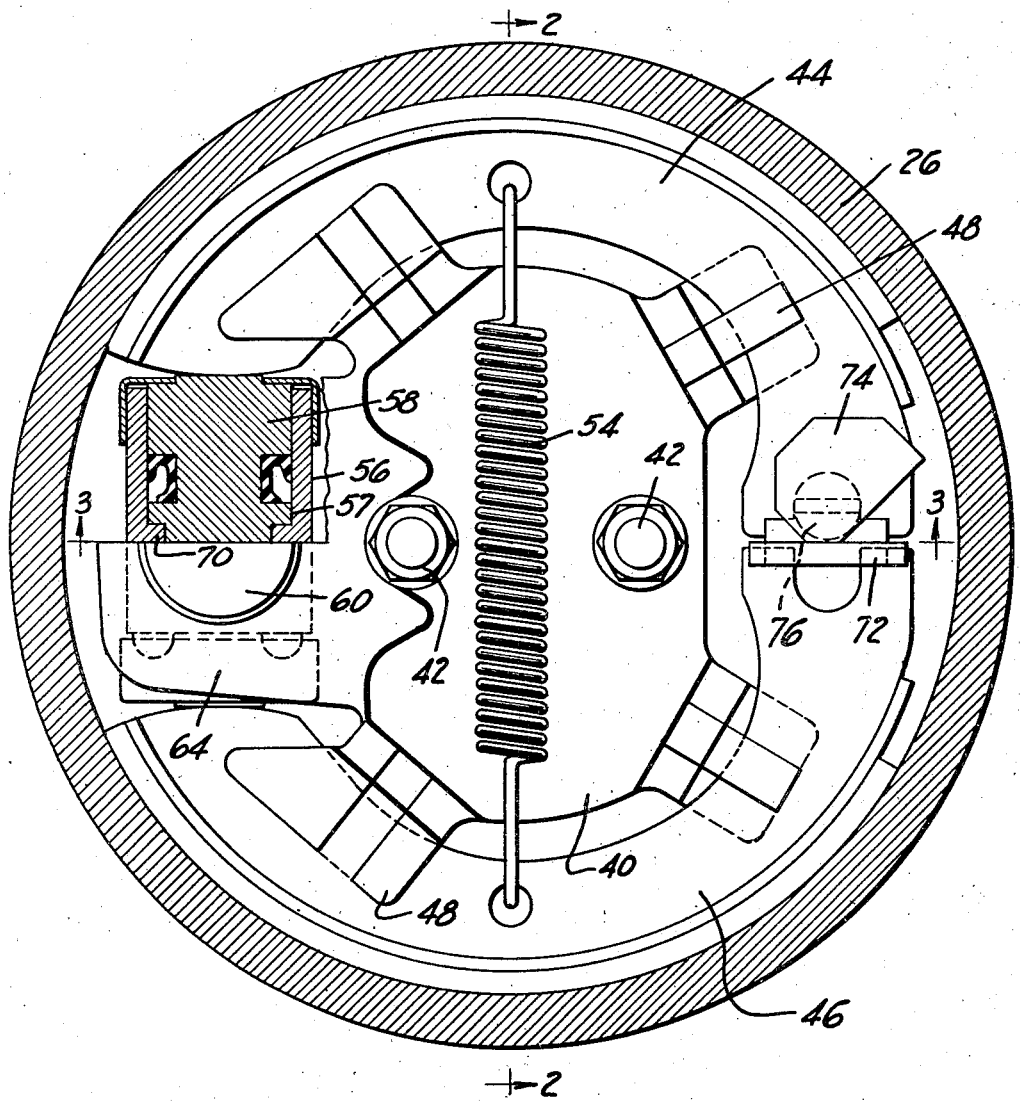
Figure 1 is a plan view of a proposed brake assembly.

Referring to the drawings, a rotatable axle 12 is journaled in bearings 14 mounted in a housing 16, which in turn is secured to the frame 18 of the vehicle by suitable means, such as a plurality of bolts 20. Secured to the end of axle 12 by suitable means, such as bolts 22, is a drum 24 having a cylindrical braking flange 26. The axle 12 is formed with gear teeth 28 through which it drives a gear 30, which in turn drives the vehicle wheel. This arrangement is one which is used on certain farm tractors and the like.

Owing to the fact that the drum 24 is at the end of the axle, it is not necessary that the axle extend through the center of the brake, as in most conventional brake assemblies. Therefore the housing 16 is formed with a cylindrical flange 32 encircling the cylindrical flange 26 of the drum, and the open end of the drum housing is closed by a cover, such as the stamped plate member 34, said member 34 being secured to the outer edge of housing 32 by suitable means, such as a plurality of bolts 36 (see Fig. 3). Because the brake assembly and brake drum are completely enclosed by housing 16 and plate 34, dust and other extraneous matter is effectively excluded.

Plate member 34 is so formed as to have its central portion 38 extending into the space inside the braking flange 26 of the drum. The arrangement is such that the braking torque of the shoes is transmitted to the central portion 38 of plate 34 and thence through housing 32 to the vehicle frame.

Figure 2:
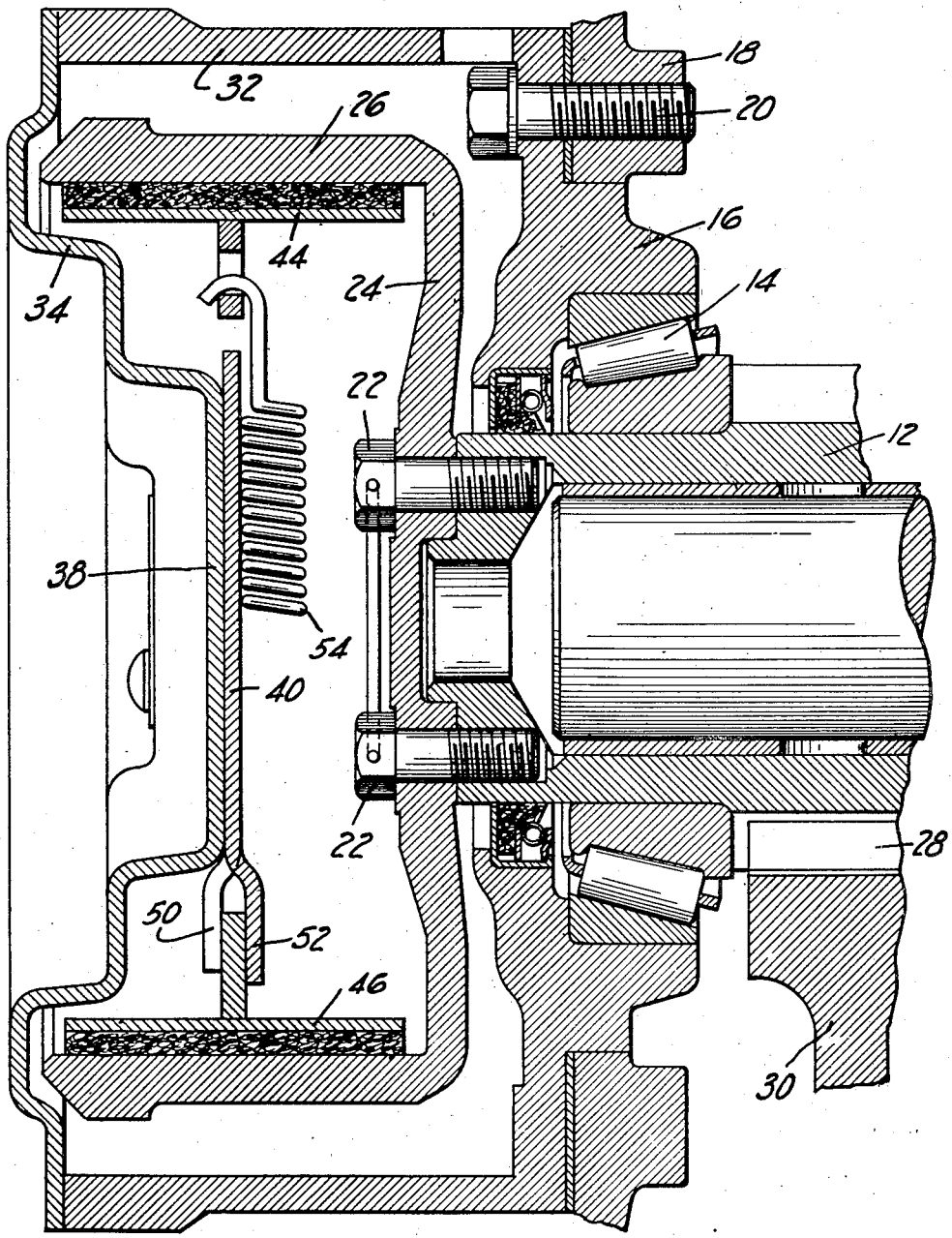
Figure 2 is a section taken on the line 2—2 of Figure 1, and showing not only the brake but also portions of the vehicle frame and axle.

I prefer to secure a plate 40, which may be formed by stamping, to the flat surface of central portion 38 of member 34 by suitable means, such as the two bolts 42, seen in Figures 1 and 3. Two brake shoes 44 and 46 are mounted on the plate 40, said plate being provided with a plurality of guides 48 for the webs of said shoes, each of said guides comprising one or more offset nibs 50 extending along one side of the respective shoe web, and one or more nibs 52 extending on the other side of the shoe web (see Figure 2). The webs of the shoes are preferably located in substantially the same plane as the flat center portion of plate 40. A single return spring 54 extending across the center of the brake assembly suffices to maintain the shoes in released position until applying force is exerted. Locating the spring at the center of the brake assembly is possible only because there is no axle or like member extending through the center of said brake assembly.

I prefer to apply spreading force at the left ends of the shoes (as seen in Fig. 1) by means of hydraulic wheel cylinder 56 having a bore 57 and having two pistons 58 oppositely disposed therein and adapted to move the ends of the respective shoes outwardly into contact with the brake drum. This hydraulic cylinder may be mounted as illustrated in Figure 3, with lateral projections 60 extending into complementary openings 62, one of which is provided in offset flange 64 of plate 40, the other of which is provided in the flat 66 formed in the outer plate 34.

Application of the brakes is accomplished in the usual way by forcing fluid under pressure from the usual master cylinder through conduit 68 into bore 57 of wheel cylinder 56, spreading the pistons 58 and moving the shoes into contact with the brake drum. Although the shoe arrangement may be of any preferred type, I have illustrated an arrangement in which one shoe anchors and is applied by the other shoe, depending upon the direction of drum rotation. The anchoring shoe is intended to anchor through the respective piston 58 against flange 70 provided at the center of wheel cylinder 56. The right ends of the shoes, as seen in Figure 1, are floating with respect to supporting plate 40, and are in contact with one another through a flat contact member 72 supported on the end of shoe 46, and adjustor 74 having a shaft 76 supported in a groove at the end of shoe 44, said adjustor 76 preferably being arranged in accordance with the principles disclosed in Goepfrich and House application Serial No. 502,858, filed September 18, 1943.

As the shoes anchor during braking, the anchoring torque is transmitted to the wheel cylinder 56, and part of the torque is then transmitted through flange 64 to the center portion 38 of plate 34, the remainder of the torque being directly transmitted to flat 66 formed on said member 34. The entire braking torque is thus absorbed at the periphery of the fixed housing 16.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. A brake comprising a drum secured to an axle near the end thereof and having a cylindrical braking flange, a housing secured to a fixed part of the vehicle and enclosing the drum, said housing having a portion extending into the space inside the braking flange of the drum, a plate secured to said portion of the housing, brake shoes mounted on said plate, the webs of said shoes being in substantially the same plane as the plate, and a hydraulic cylinder for actuating the shoes straddle mounted between an offset flange on the plate and a portion of the housing offset in the opposite direction from the part of the housing to which the plate is secured.

2. A brake comprising a drum secured to an axle near the end thereof and having a cylindrical braking flange, a housing secured to a fixed part of the vehicle and enclosing the drum, said housing having a portion extending into the space inside the braking flange of the drum, a plate secured to said portion of the housing, two brake shoes mounted on said plate, and a single return spring connecting said shoes across the center of the brake and urging them to released position.

3. A brake comprising a drum secured to an axle near the end thereof and having a cylindrical braking flange, a housing secured to a fixed part of the vehicle and enclosing the drum, said housing having a portion extending into the space inside the braking flange of the drum, a plate secured to said portion of the housing, brake shoes mounted on said plate, and an actuator arranged to spread the shoes and straddle mounted between an offset flange on the plate and a portion of the housing offset in the opposite direction from the part of the housing to which the plate is secured.

4. In a vehicle having a fixed axle housing and an axle rotatably supported therein, a brake and brake housing comprising a drum secured to the axle near the end thereof and having an outwardly extending cylindrical braking flange, a fixed flange extending outwardly from said axle housing to overlie the cylindrical flange of the brake drum, a plate-like closure member for said housing secured to the outer edge of said fixed flange to complete the brake chamber and having an axially inwardly offset flat central portion situated in the space inside the braking flange of the drum, a second plate-like member having a flat center portion lying against and secured to the flat portion of the first-mentioned plate-like member, brake shoes supported by said second plate-like member, and spreading means for the shoes straddle mounted between an offset flange on said second plate-like member and a portion of the first plate-like member which is offset in the opposite direction from the part of said member to which said second plate-like member is secured.

5. In a vehicle having a fixed axle housing and an axle rotatably supported therein, a brake and brake housing comprising a drum secured to the axle near the end thereof and having an outwardly extending cylindrical braking flange, a fixed flange extending outwardly from said axle housing to overlie the cylindrical flange of the brake drum, a plate-like stamping secured to the outer edge of said fixed flange to complete the brake chamber and having an axially inwardly offset flat central portion situated in the space inside the braking flange of the drum, a second plate-like stamping having a flat center portion lying against and secured to the flat portion of the first-mentioned stamping, brake shoes supported by said second stamping, and spreading means for the shoes straddle mounted between an offset flange on said second stamping and a portion of the first stamping which is offset in the opposite direction from the part thereof to which said second stamping is secured.

6. In a vehicle having a fixed axle housing and an axle rotatably supported therein, a brake and brake housing comprising a drum secured to the axle near the end thereof and having an outwardly extending cylindrical braking portion, a flange extending outwardly from said axle housing to overlie the braking portion of the brake drum, a plate-like closure member for said housing secured to the outer edge of said flange to complete the brake chamber and having an axially inwardly offset central portion situated in the space inside the braking portion of the drum, a second plate-like member secured directly to the central portion of the first-mentioned plate-like member, brake shoes supported by at least one of said plate-like members, and spreading means for the shoes straddle mounted between said plate-like members.

7. In a vehicle having a fixed axle housing and an axle rotatably supported therein, a brake and brake housing comprising a drum secured to the axle near the end thereof and having an outwardly extending cylindrical braking portion, a flange extending outwardly from said axle housing to overlie the braking portion of the brake drum, a closure member for said housing secured to the outer edge of said flange to complete the brake chamber and having an axially inwardly offset central portion situated in the space inside the braking portion of the drum, a support member secured directly to the central portion of the closure member, brake shoes supported by at least one of said members, and spreading means for the shoes straddle mounted between said members.

BRYAN E. HOUSE.